(12) United States Patent
Low et al.

(10) Patent No.: US 8,934,857 B2
(45) Date of Patent: Jan. 13, 2015

(54) CONTROLLING FIELD DISTRIBUTION OF A WIRELESS POWER TRANSMITTER

(75) Inventors: Zhen Ning Low, La Jolla, CA (US); Charles E. Wheatley, III, San Diego, CA (US); Adam A. Mudrick, San Diego, CA (US); William H. Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 12/951,265

(22) Filed: Nov. 22, 2010

(65) Prior Publication Data

US 2011/0281535 A1  Nov. 17, 2011

Related U.S. Application Data

(60) Provisional application No. 61/345,435, filed on May 17, 2010, provisional application No. 61/334,783, filed on May 14, 2010.

(51) Int. Cl.
| | |
|---|---|
| *H04B 1/04* | (2006.01) |
| *H04B 5/00* | (2006.01) |
| *H02J 17/00* | (2006.01) |
| *H02J 7/02* | (2006.01) |

(52) U.S. Cl.
CPC .............. *H04B 5/0037* (2013.01); *H02J 17/00* (2013.01); *H02J 7/025* (2013.01); *H04B 5/0081* (2013.01)
USPC ............................ 455/129; 307/104; 320/108

(58) Field of Classification Search
None
See application file for complete search history.

(56) References Cited

U.S. PATENT DOCUMENTS

| | | | |
|---|---|---|---|
| 6,034,638 A * | 3/2000 | Thiel et al. ................... | 343/702 |
| 6,906,495 B2 | 6/2005 | Cheng et al. | |
| 7,265,731 B2 * | 9/2007 | Vance et al. .................. | 343/860 |
| 7,948,208 B2 | 5/2011 | Partovi et al. | |
| 7,952,322 B2 | 5/2011 | Partovi et al. | |
| 2006/0139211 A1 * | 6/2006 | Vance et al. ........... | 343/700 MS |
| 2007/0069958 A1 * | 3/2007 | Ozkar .................... | 343/700 MS |
| 2008/0303633 A1 * | 12/2008 | Cheng et al. ................. | 340/10.1 |
| 2009/0046022 A1 * | 2/2009 | Desclos et al. ................ | 343/702 |
| 2009/0096413 A1 | 4/2009 | Partovi et al. | |
| 2009/0134712 A1 * | 5/2009 | Cook et al. .................... | 307/104 |
| 2009/0179502 A1 * | 7/2009 | Cook et al. .................... | 307/104 |
| 2009/0212636 A1 * | 8/2009 | Cook et al. .................... | 307/104 |
| 2009/0243397 A1 | 10/2009 | Cook et al. | |
| 2009/0278746 A1 * | 11/2009 | Aurinsalo et al. ..... | 343/700 MS |
| 2009/0284082 A1 | 11/2009 | Mohammadian | |
| 2010/0038970 A1 * | 2/2010 | Cook et al. .................... | 307/104 |
| 2010/0052431 A1 | 3/2010 | Mita | |
| 2011/0050164 A1 | 3/2011 | Partovi et al. | |
| 2011/0074349 A1 * | 3/2011 | Ghovanloo .................. | 320/108 |

FOREIGN PATENT DOCUMENTS

| | | |
|---|---|---|
| CN | 101095262 A | 12/2007 |
| JP | 2003086233 A | 3/2003 |

(Continued)

OTHER PUBLICATIONS

International Search Report and Written Opinion—PCT/US2011/036421, ISA/EPO—Sep. 16, 2011.

*Primary Examiner* — Ajibola Akinyemi
(74) *Attorney, Agent, or Firm* — Knobbe Martens Olson & Bear LLP

(57) ABSTRACT

Exemplary embodiments are directed to control of field distribution of a wireless power transmitter. A transmitter may include a transmit antenna configured to generate a field. The transmitter may further include least one parasitic antenna proximate the transmit antenna and configured to modify a distribution of the generated field.

20 Claims, 10 Drawing Sheets

(56) References Cited

FOREIGN PATENT DOCUMENTS

| JP | 2010063245 A | 3/2010 |
|---|---|---|
| WO | WO2005104296 A1 | 11/2005 |
| WO | WO-2009023646 A2 | 2/2009 |
| WO | WO-2009111597 A2 | 9/2009 |
| WO | WO2010014634 A2 | 2/2010 |
| WO | WO-2010047850 A1 | 4/2010 |

* cited by examiner

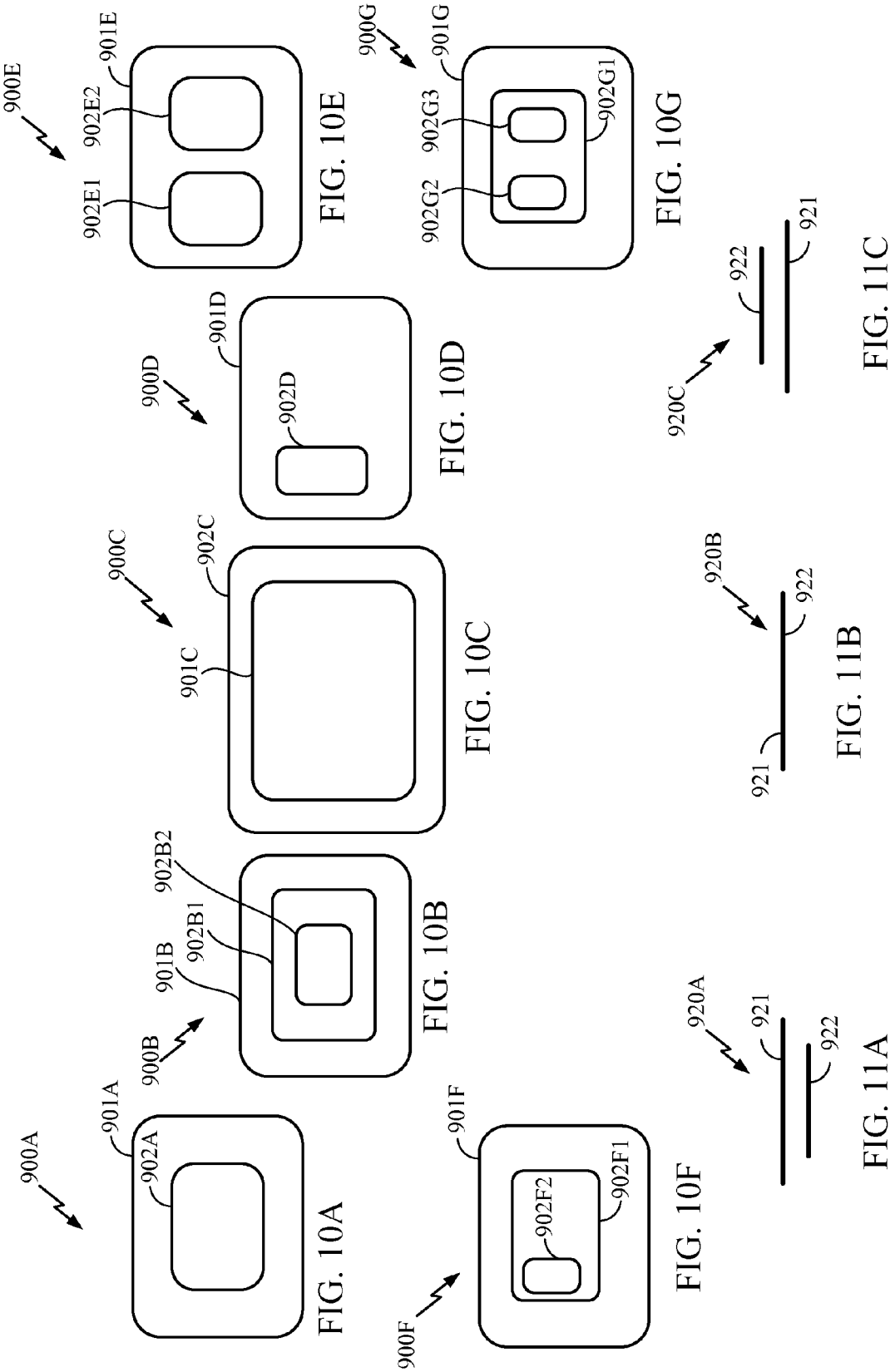

US 8,934,857 B2

CONTROLLING FIELD DISTRIBUTION OF A WIRELESS POWER TRANSMITTER

CLAIM OF PRIORITY UNDER 35 U.S.C. §119

This application claims priority under 35 U.S.C. §119(e) to:

U.S. Provisional Patent Application 61/345,435 entitled "ALTERING MAGNETIC FIELD DISTRIBUTION USING REACTIVELY LOADED PARASITIC COIL(S)" filed on May 17, 2010, the disclosure of which is hereby incorporated by reference in its entirety; and U.S. Provisional Patent Application 61/334,783 entitled "CONTROLLING MAGNETIC FIELD DISTRIBUTION VIA PARASITIC LOOPS" filed on May 14, 2010, the disclosure of which is hereby incorporated by reference in its entirety

BACKGROUND

1. Field

The present invention relates generally to wireless power, and more specifically, to systems, device, and methods related to controlling distribution of a field generated by a wireless power transmitter.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

Further, additional receivers or metal objects positioned within an associated charging region may detune a transmitter by reducing the self inductance thereof. Variation in impedance looking into the transmitting coil of the transmitter may affect the performance of an associated driving amplifier. If the transmitting coil is significantly larger than the receiving coil, the coupling efficiency between the coils may suffer, which may impact charge time and cause potential thermal issues. Therefore, a higher efficiency coupling structure is desirable. It is also desirable to know the locations of one or more receivers within an associated charging region so that power may be diverted to the respective receivers.

A need exists for methods, systems, and devices to for controlling field distribution of a wireless power transmitter. More specifically, a need exists for methods, systems, and devices for utilizing one or more parasitic antennas to control the field distribution of a wireless power transmitter.

BRIEF DESCRIPTION OF THE DRAWINGS

FIGS. 10A-10G illustrate various example wireless power transmitter configurations wherein each configuration includes a transmit antenna and at least one parasitic antenna, in accordance with an exemplary embodiment of the present invention.

FIGS. 11A-11C illustrate cross-sectional views of various example wireless power transmitter configurations wherein each configuration includes a transmit antenna and a parasitic antenna, in accordance with an exemplary embodiment of the present invention.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors. Hereafter, all three of this will be referred to generically as radiated fields, with the understanding that pure magnetic or pure electric fields do not radiate power. These must be coupled to a "receiving antenna" to achieve power transfer.

Figure 1:
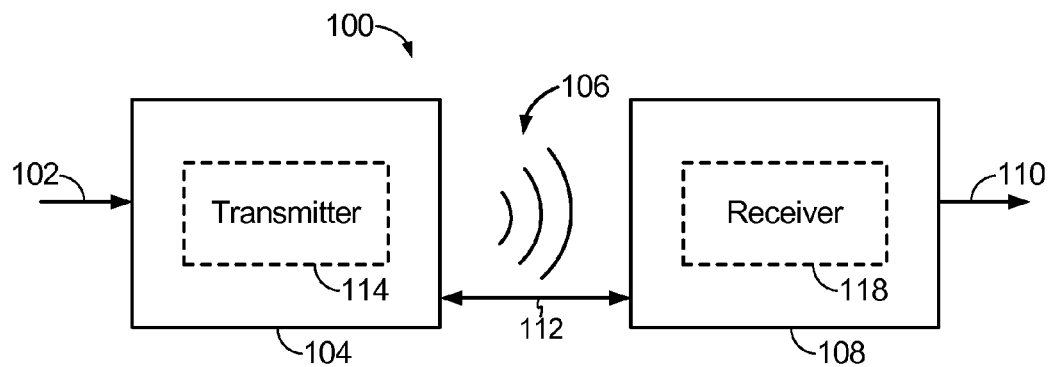
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
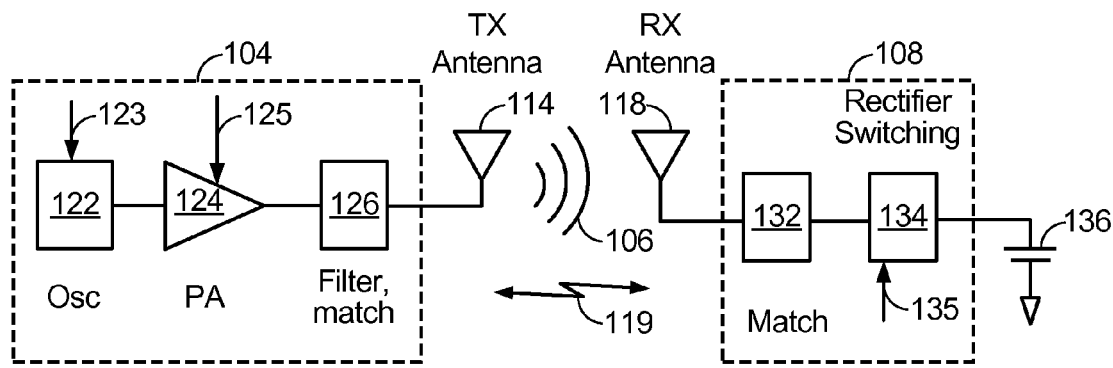
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as, for example only, 468.75 KHz, 6.78 MHz or 13.56, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
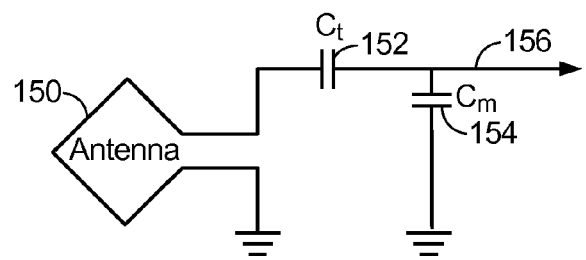
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance (i.e., the frequencies are matched) between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger antennas, the size of capacitance needed to induce resonance decreases as the inductance of the loop increases due to increasing coil diameter and/or number of turns Furthermore, as the diameter of the loop or magnetic antenna increases, the efficient energy transfer area of the near-field increases. Of course, other resonant circuits may be possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4A:
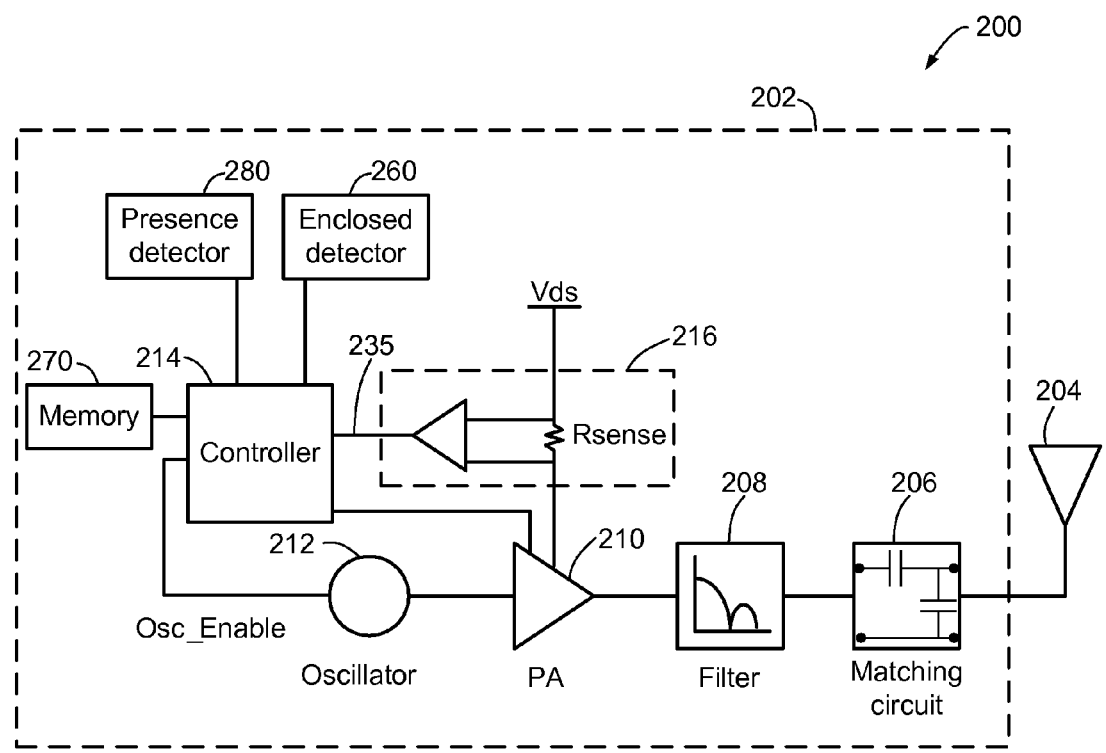
FIG. 4A is a simplified block diagram of a transmitter, in accordance with an exemplary embodiment of the present invention.

FIG. 4A is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 (i.e., the load and the source are matched to enhance efficiency) and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 may not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 4B:
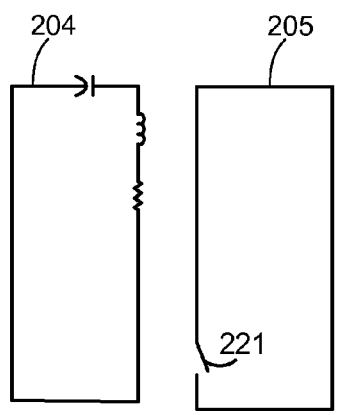
FIG. 4B illustrates a parasitic antenna including a switch positioned proximate a transmit antenna.
Figure 4C:
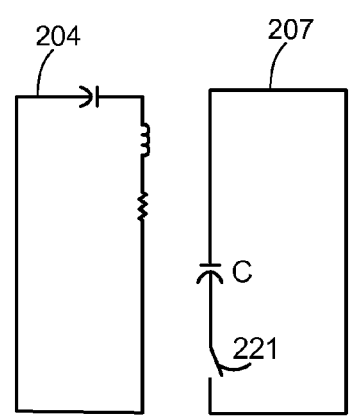
FIG. 4C illustrates a parasitic antenna including a switch and a capacitor positioned proximate a transmit antenna.

FIG. 4B illustrates transmit antenna 204 proximate a parasitic antenna 205 including a switch 221, which may be selectively controlled. As described more fully below, a shorted parasitic antenna (i.e., parasitic antenna 205 with switch 221 closed) may induce a current that modifies (i.e., opposes) a field generated by transmit antenna 204. FIG. 4C illustrates transmit antenna 204 proximate a parasitic antenna 207 including switch 221, which may be selectively controlled, and a capacitor C. As described more fully below, a shorted parasitic antenna having a capacitor (i.e., parasitic antenna 207 with switch 221 closed) may induce a current that modifies a field generated by transmit antenna 204.

Figure 5:
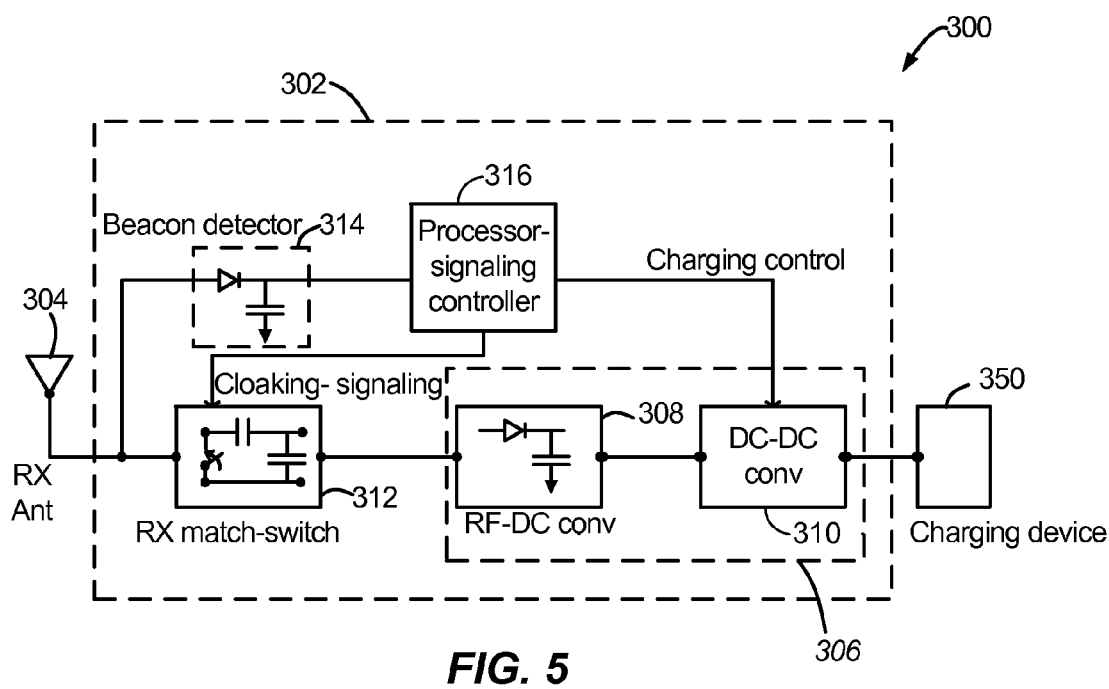
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4A). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. This "unloading" of a receiver is also known herein as a "cloaking" A receiver may also be cloaked in order to eliminate coupling to other nearby receivers or to reduce loading on nearby transmitters, or to enable the transmitter to accurately determine the characteristics of just one "cloaked" receiver. Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in delivered power as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments of the present invention, as described herein, relate to systems, devices, and methods for controlling a field distribution of a wireless power system, via one or more parasitic antennas. More specifically, exemplary embodiments of the invention may enable for enhanced coupling efficiency, less thermal problems, and improved charging times. Furthermore, exemplary embodiments may enable for an increased charging area for supporting more chargeable devices, thus, enhancing user experience without impacting efficiency and charge time. It is noted that the terms "parasitic coil" "parasitic loop" and "parasitic antenna" may be used herein interchangeably.

According to one exemplary embodiment of the present invention, a detuned and shorted parasitic antenna (i.e., a dead short parasitic antenna), which is positioned proximate a transmit antenna, may generate, due to an induced current, a field (e.g., a magnetic field) that opposes a field (e.g., a magnetic field) generated by the transmit antenna. Accordingly, in this exemplary embodiment, an area within the parasitic antenna may be void of a magnetic field and the self-inductance of the transmit antenna may be reduced. Furthermore, according to another exemplary embodiment, the parasitic antenna may be opened (i.e., open-circuited) (e.g., via a switch) and, therefore, may not induce an effect on the transmit antenna or a magnetic field distribution proximate the transmit antenna.

According to another exemplary embodiment of the present invention, one or more parasitic antennas having a fixed reactance (e.g., capacitance) and positioned proximate a transmit antenna, may induce current therein to modify a magnetic field generated by the transmit antenna.

As described more fully below, one or more parasitic antennas may be positioned proximate a transmit antenna in a row array, a column array, or any combination thereof (i.e., a dual layer with overlapping row and column arrays). Furthermore, parasitic antennas may be positioned proximate a transmit antenna in a grid array, which may comprise one or more layers. Moreover, the one or more parasitic antennas may be positioned above a transmit antenna, below the transmit antenna, or co-planar with the transmit antenna.

The parasitic antennas may be the same size as an associated transmit antenna, smaller than the transmit antenna, or larger than the transmit antenna. The one or more parasitic antennas may comprise a single turn or multiple turns. It is noted that a shorted parasitic coil, according to an exemplary embodiment of the present invention, may have a substantially similar detuning effect (reduction on transmitting coil self inductance) as an electronic device (e.g., a mobile telephone) of substantially similar size.

During one contemplated phase, resonance match may be obtained by shorting all parasitic antennas not having a compatible receiver within an associated loop and opening each parasitic antenna having at least one compatible receiver within the associated loop. It is noted that the cumulative detuning effect of each receiver positioned within a charging region of the transmit antenna and shorted parasitic coils is the same regardless of the number of receivers. Therefore, the self inductance of the transmit antenna may be bound regardless of the number of receivers being placed within an associated charging region.

As noted above, according to another exemplary embodiment of the present invention, one or more parasitic coils, wherein each parasitic coil has a fixed reactance, may be integrated within a wireless power transmitter to enable a magnetic field distribution of the wireless power transmitter to be modified (e.g., even out the magnetic field distribution). The loops of the parasitic antennas may be smaller than the externally excited coil (i.e., the transmit antenna) to improve magnetic field distribution or steer the field in the desirable zone. Furthermore, loops of the parasitic antennas may be larger than the externally excited coil to increase effective charging area. The one or more parasitic antennas may be arranged in a concentric layout to improve overall field distribution or a non-concentric layout to improve field distribution in a specific zone. Further, the one or more parasitic antennas may be of a single turn winding or multiple turns winding.

The extent of the effect of the one or more parasitic antennas on a magnetic field generated by a transmit antenna may be dependent on a current induced in the parasitic antenna, which may depend on the mutual inductance between the parasitic antennas and the transmit antenna. This current may be controlled by a size of the parasitic antenna (i.e., larger size equals more current), a number of turns of the parasitic antenna (i.e., more turns equals more current), a distance (i.e., vertical and lateral) between the parasitic antenna and the transmit antenna (i.e., closer equals more current), and a distance between the parasitic antenna and a charging surface of a wireless power transmitter (i.e., greater distance equal less affect).

As described more fully below, the one or more parasitic antenna may be positioned above the transmit antenna to improve mutual coupling (resulting in increased efficiency) to receivers further away from an associated charging surface. Further, the one or more parasitic antenna may be co-planar with the transmit antenna to reduce transmitter profile. Moreover, the one or more parasitic antenna may be positioned below the transmit antenna to reduce the extent of field alteration.

It is noted that one or more capacitor values across a parasitic antenna may control the phase difference between a transmit antenna and the parasitic antenna. Accordingly, the value of the capacitor across a parasitic antenna may be selected for a desirable response. An extremely small capacitor (similar to an open circuit) may have a minimal impact on overall field distribution. A capacitor having an extremely large value (similar to a short circuit) may achieve minimum field strength in the middle of the respective parasitic antenna and maximum field strength in the region outside the respective parasitic antenna of a concentric layout. A capacitor that has a value less than a value of a capacitor that drives the resonance frequency to the operating frequency may achieve substantial even field distribution for a concentric layout by reducing field strength in the region outside the respective parasitic antenna and increasing field strength in the region inside the respective parasitic antenna. A capacitor that has a value equal to a value of a capacitor that drives the resonance frequency to the operating frequency may achieve maximum field strength in the middle of the respective parasitic antenna and minimum field strength in the region outside the respective parasitic antenna for a concentric layout. A capacitor that has a capacitor value greater than a value of a capacitor that drives the resonance frequency to the operating frequency may achieve weaker field strength in the region inside the respective parasitic antenna and stronger field strength in the region outside the respective parasitic antenna. It is note that additional capacitors can be switched into a parasitic antenna to actively steer the magnetic field into a desirable region and away from an undesirable region. Table 1 below further illustrates the effect of capacitor values on a current in a parasitic antenna and field distribution of a wireless power transmitter.

TABLE 1

| Capacitance value | Current in the parasitic antenna | Field inside the parasitic antenna | Field outside the parasitic antenna |
| --- | --- | --- | --- |
| Parasitic antenna is open-circuited | No current | No change | No change |
| Resonance greater than operating frequency | Out of phase but same direction as current in transmit antenna | Strengthened | Weakened |
| Resonance equal to operating frequency | In phase with current in transmit antenna | Maximum | Minimum |
| Resonance less than operating frequency | Out of phase but in opposite direction as current in transmit antenna | Weakened | Strengthened |

TABLE 1-continued

| Capacitance value | Current in the parasitic antenna | Field inside the parasitic antenna | Field outside the parasitic antenna |
|---|---|---|---|
| Parasitic antenna is close-circuited | 180° out of phase with current in transmit antenna | Minimum | Maximum |

Figure 6C:
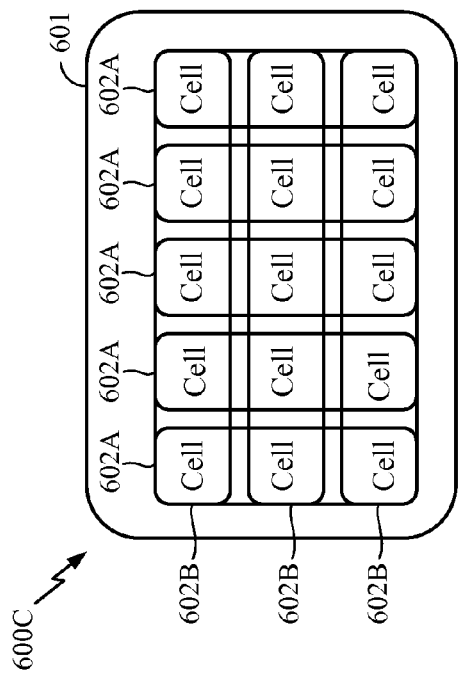
FIG. 6C illustrates another wireless power transmitter including a transmit antenna and a plurality of parasitic antennas in a first direction and another plurality of parasitic antennas in a second direction, in accordance with an exemplary embodiment of the present invention.
Figure 6D:
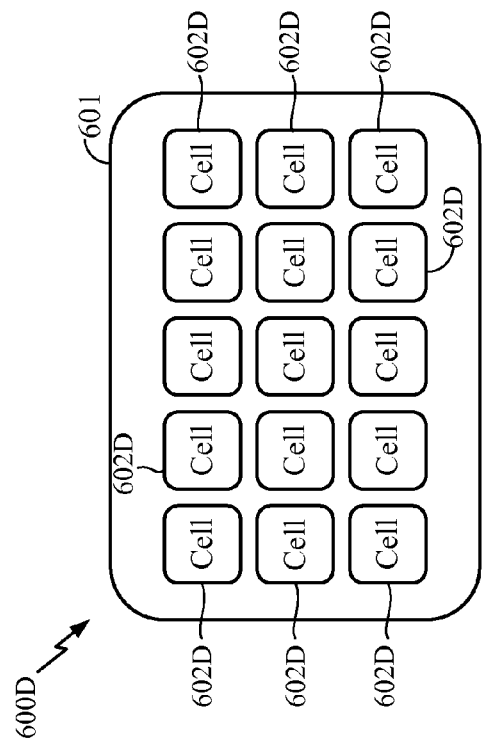
FIG. 6D illustrates yet another wireless power transmitter including a transmit antenna and a multi-dimensional array of parasitic antennas, according to an exemplary embodiment of the present invention.
Figure 6A:
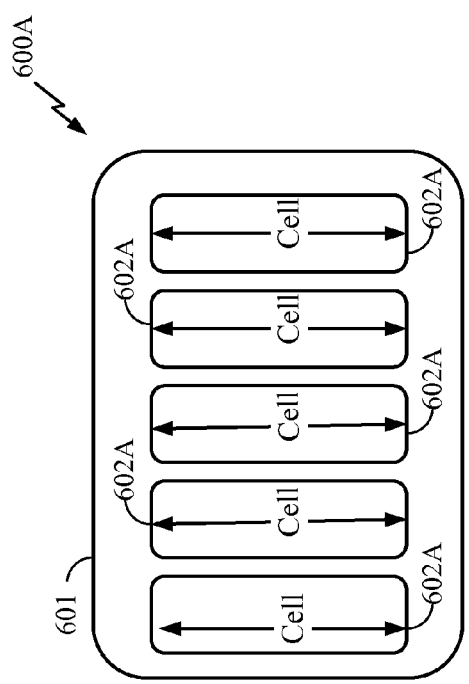
FIG. 6A illustrates a wireless power transmitter including a transmit antenna and a plurality of parasitic antennas, according to an exemplary embodiment of the present invention.
Figure 6B:
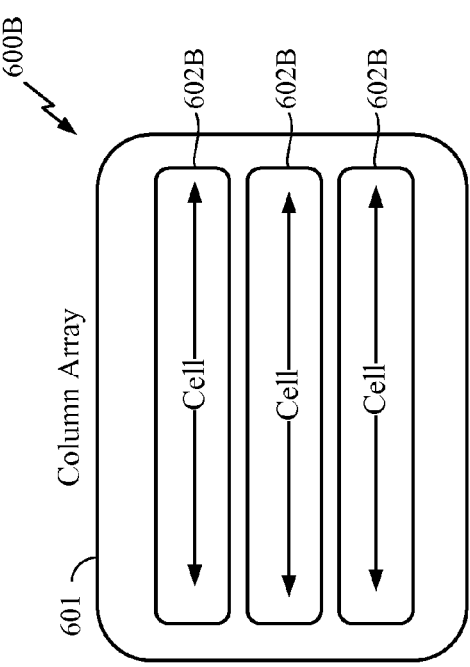
FIG. 6B illustrates another wireless power transmitter including a transmit antenna and a plurality of parasitic antennas, in accordance with an exemplary embodiment of the present invention.

Various exemplary embodiments of the present invention will now be described with reference to FIGS. 6A-13. FIG. 6A illustrates a wireless power transmitter 600A including a transmit antenna 601 and a plurality of parasitic antennas 602A, according to an exemplary embodiment of the present invention. FIG. 6B illustrates a wireless power transmitter 600B including a transmit antenna 601 and a plurality of parasitic antennas 602B, according to another exemplary embodiment of the present invention. Parasitic antennas 602A illustrated in FIG. 6A are positioned in a row array and parasitic antennas 602B illustrated in FIG. 6B are positioned in a column array. FIG. 6C illustrates a wireless power transmitter 600C, according to yet another exemplary embodiment of the present invention. Wireless power transmitter 600C includes transmit antenna 601, a plurality of parasitic antennas 602A, which are in a row array, and a plurality of parasitic antennas 602B, which are in a column array. Parasitic antennas 602A and parasitic antennas 602B are in a dual-layer configuration. Another exemplary embodiment of the present invention is illustrated in FIG. 6D, which depicts a wireless power transmitter 600D including transmit antenna 601 and a plurality of parasitic antennas 602D arranged in a row and column array. It is noted that, as used herein and as illustrated in FIGS. 6A-6D, a "cell" is the smallest possible area that can be controlled by one or more parasitic antennas.

Figure 7A:
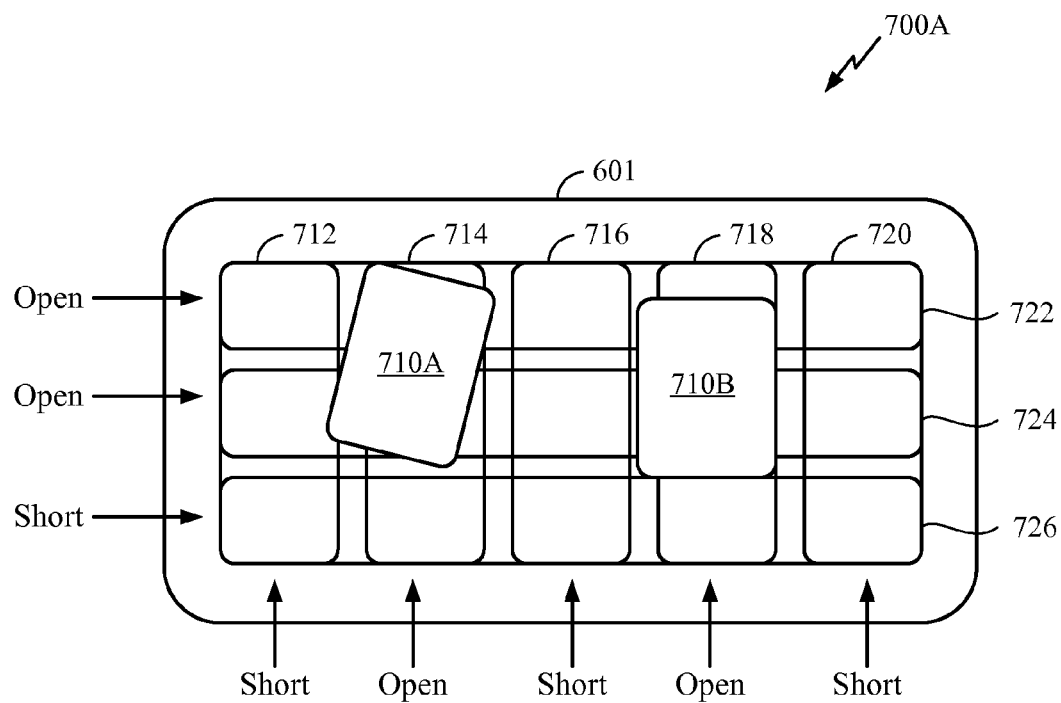
FIG. 7A illustrates a wireless power system including a wireless power transmitter and a plurality of wireless power receivers, in accordance with an exemplary embodiment of the present invention.

FIG. 7A illustrates an example of a wireless power system 700A including a wireless power transmitter 700A including a plurality of parasitic antennas 712, 714, 716, 718, and 720 and another plurality of parasitic antennas 722, 724, and 726 in a dual-layer configuration. More specifically, wireless power transmitter 700A includes parasitic antennas 712, 714, 716, 718, and 720, which are positioned in one direction (i.e., parallel to one another), and parasitic antennas 722, 724, and 726, which are positioned in another direction (i.e., parallel to one another and perpendicular to parasitic antennas 712, 714, 716, 718, and 720). Moreover, wireless power system 700 includes a first wireless power receiver 710A and a second wireless power receiver 710B. In an example wherein each of first wireless power receiver 710A and a second wireless power receiver 710B comprise a compatible device, wireless power transmitter 700A may open each of parasitic antennas 722, 724, 714, and 718 and short each of parasitic antennas 712, 716, 720, and 726. Accordingly, areas within any of parasitic coils 712, 716, 720, and 726 may comprise a null field zone. Accordingly, in this example, receiver 710A or receiver 710B may receive power generated by transmit antenna 601.

Figure 7B:
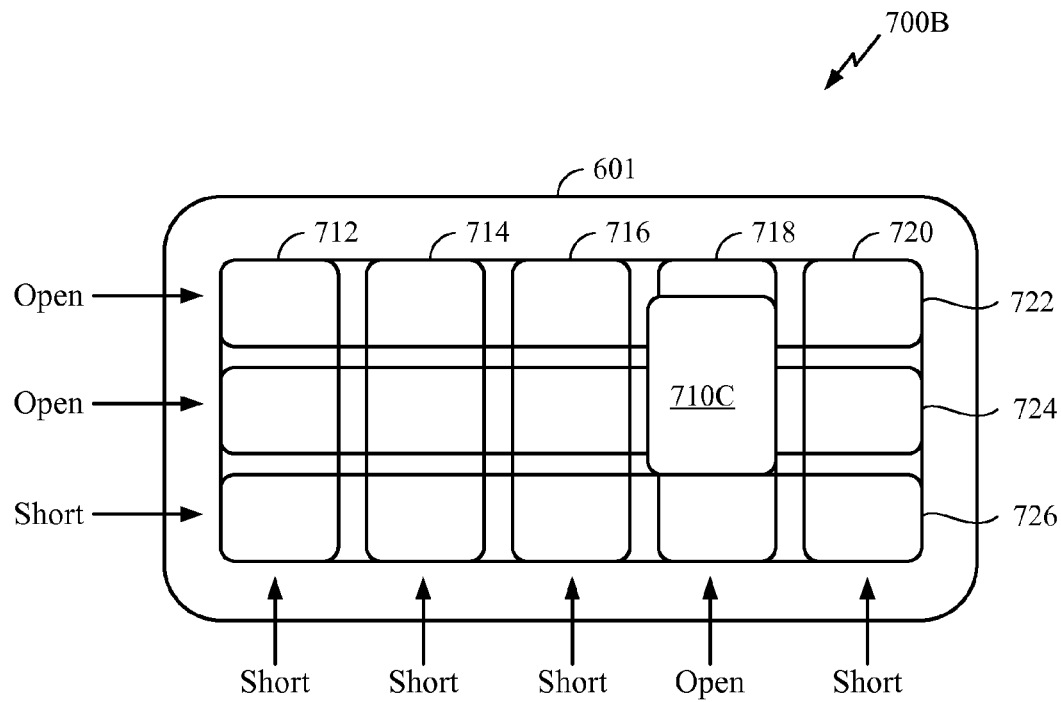
FIG. 7B illustrates another wireless power system including a wireless power transmitter and a wireless power receiver, according to an exemplary embodiment of the present invention.

FIG. 7B illustrates another example wireless power system 700B including a wireless power transmitter 700A including a plurality of parasitic antennas 712, 714, 716, 718, and 720 and another plurality of parasitic antennas 722, 724, and 726 in a dual-layer configuration. More specifically, wireless power transmitter 700A includes parasitic antennas 712, 714, 716, 718, and 720, which are positioned in one direction (i.e., parallel to one another), and parasitic antennas 722, 724, and 726, which are positioned in another direction (i.e., parallel to one another and perpendicular to parasitic antennas 712, 714, 716, 718, and 720). Moreover, wireless power system 700 includes a wireless power receiver 710C. In an example wherein wireless power receiver 710C comprises a compatible device, wireless power transmitter 700B may open each of parasitic antennas 718, 722 and 724 and short each of parasitic antennas 712, 714, 716, 720, and 726. Accordingly, areas within any of parasitic coils 712, 714, 716, 720, and 726 may comprise a null field zone. Accordingly, in this example, receiver 710C may receive power generated by transmit antenna 601.

Figure 8A:
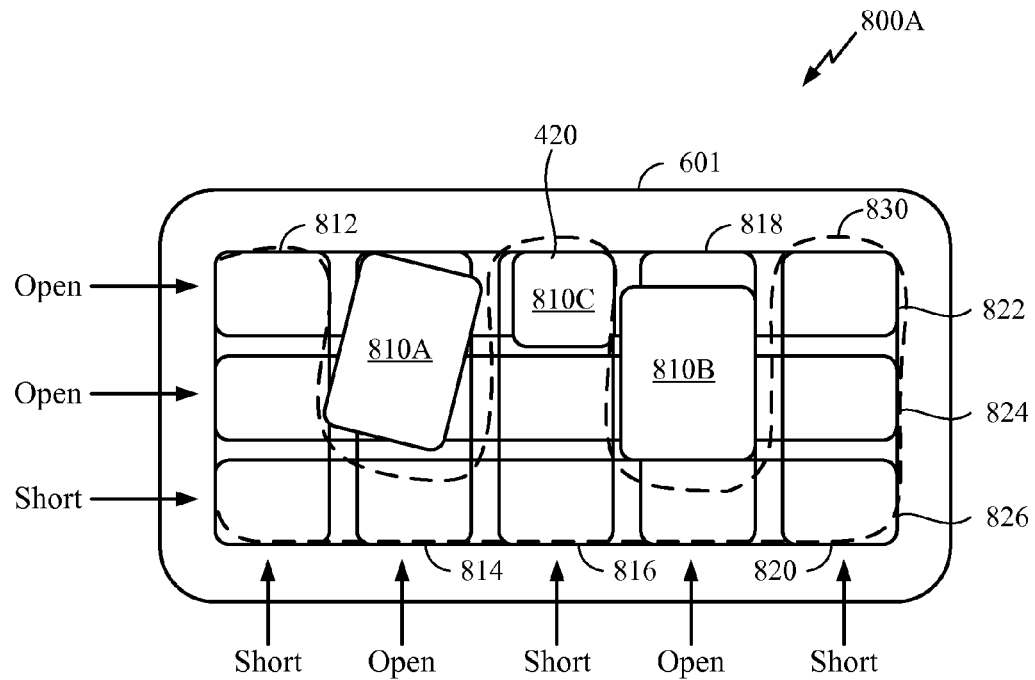
FIG. 8A illustrates a wireless power system including a wireless power transmitter and a plurality of wireless power receivers including a non-compatible receiver, according to an exemplary embodiment of the present invention.

FIG. 8A illustrates an example of a wireless power system 800A including a wireless power transmitter 800A including a plurality of parasitic antennas 812, 814, 816, 818, and 820 and another plurality of parasitic antennas 822, 824, and 826. Similarly to wireless power transmitter 700A, wireless power transmitter 800A includes parasitic antennas 812, 814, 816, 818, and 820, which are positioned in one direction (i.e., parallel to one another), and parasitic antennas 822, 824, and 826, which are positioned in another direction (i.e., parallel to one another and perpendicular to parasitic antennas 812, 814, 816, 818, and 820). Moreover, wireless power system 800A includes a first wireless power receiver 810A and a second wireless power receiver 810B, each of which, in this example, comprise compatible devices. Furthermore, wireless power system 800A includes a device 810C, which, in this example, comprises a non-compatible device, such as a near-field communication (NFC) device or a rogue receiver. During a contemplated operation of wireless power system 800A, the wireless power transmitter may open each of parasitic antennas 814, 818, 822, and 824 and short each of parasitic antennas 812, 816, 820, and 826. As a result, areas within any of shorted parasitic antennas 812, 816, 820, and 826 may comprise null field zones. It is noted that device 810C is positioned within null field zone 830 and, therefore, power received by device 810C, if any, may be limited. Further, receiver 810A and receiver 810B are not within null field zone 830 and, therefore, may receive power generated by transmit antenna 601.

Figure 8B:
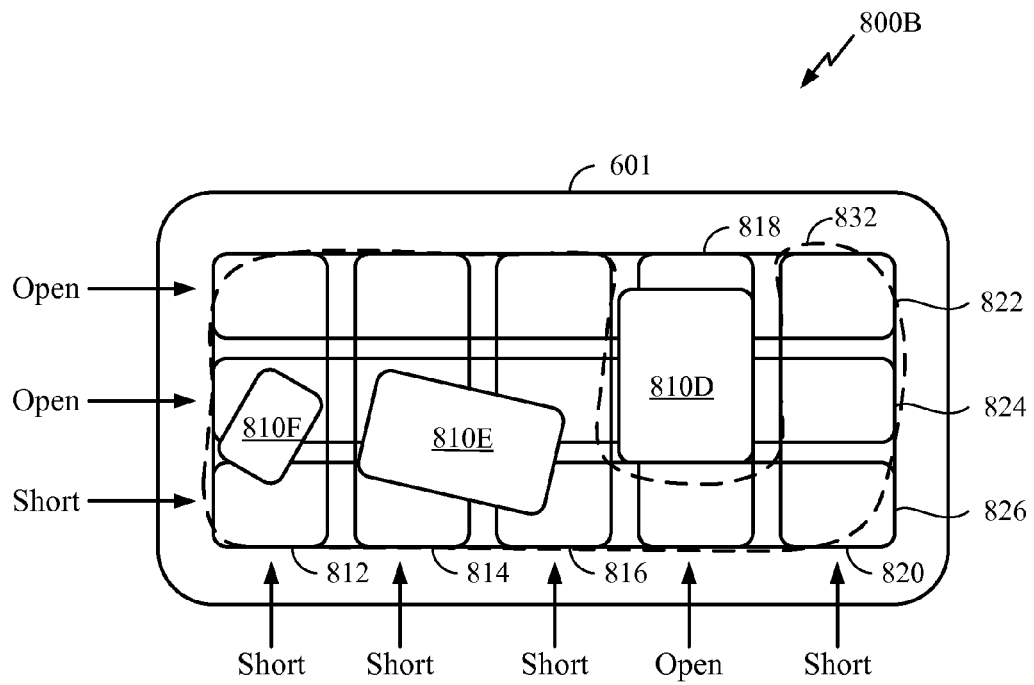
FIG. 8B illustrates a wireless power system including a wireless power transmitter and a plurality of wireless power receivers including a plurality of non-compatible receivers, in accordance with an exemplary embodiment of the present invention.

FIG. 8B illustrates an example of a wireless power system 800B including a wireless power transmitter 801B including parasitic antennas 812, 814, 816, 818, 820, 822, 824, and 826. Similarly to wireless power transmitter 800A, wireless power parasitic antennas 812, 814, 816, 818, and 820 are positioned in one direction (i.e., parallel to one another), and parasitic antennas 822, 824, and 826 are positioned in another direction (i.e., parallel to one another and perpendicular to parasitic antennas 812, 814, 816, 818, and 820). Moreover, wireless power system 800B includes wireless power receiver 810D, which, in this example, comprises a compatible device. Furthermore, wireless power system 800A includes a device 810E and a device 810F, each of which, in this example, comprise an incompatible device, such as a near-field communication (NFC) device or a rogue receiver. During a contemplated operation of wireless power system 800B, the wireless power transmitter may open each of parasitic antennas 818, 822, and 824 and short each of parasitic antennas 812, 814, 816, 820, and 826. As a result, areas within any of shorted parasitic antennas 812, 814, 816, 820, and 826 may comprise null field zones. It is noted that device 810E and device 810F are positioned within null field zone 832 and, therefore, power received by either device 810E or device 810F, if any, may be limited. Further, receiver 810D is not within null field zone 832 and, therefore, may receive power generated by transmit antenna 601.

Figure 9:
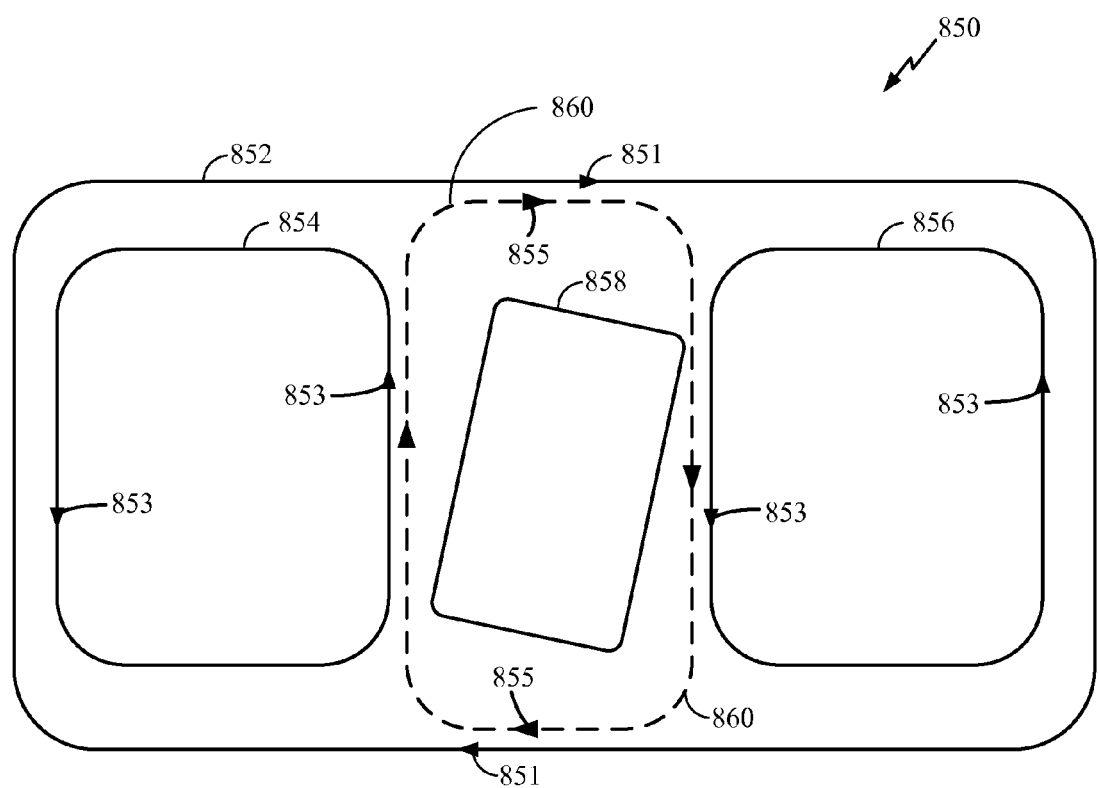
FIG. 9 illustrates a wireless power system including a wireless power transmitter, a plurality of parasitic antennas, and a compatible receiver, according to an exemplary embodiment of the present invention.

FIG. 9 illustrates a wireless power system 850 including a wireless power transmitter 852 including transmit antenna 852, a parasitic antenna 854, and a parasitic antenna 856.

Wireless power system 850 also includes receiver 858 positioned within a charging region of wireless power transmitter 852. With reference to FIG. 9, parasitic antenna 854 and parasitic antenna 856, each of which are short-circuited and adjacent to transmit antenna 852, have an induced current which opposes a magnetic field generated by transmit antenna 852. A current within transmit antenna 852 is in the direction depicted by arrows 851 and currents within parasitic antenna 854 and parasitic antenna 856 are in the direction depicted by arrows 853. Further, a current within a region 860 is in the direction depicted by arrows 855. Accordingly, a magnetic field within each of parasitic antenna 854 and parasitic antenna 856 may be reduced and a magnetic field within region 860 may be enhanced and, therefore, coupling efficiency may be improved. It is noted that the parasitic antennas illustrated in FIGS. 6A-9 comprise "dead-shorted" parasitic antennas.

As will be understood by a person having ordinary skill in the art, the one or more shorted parasitic antennas may re-couple the energy from the transmit antenna to a receiver via the mutual inductance between the one or more parasitic antennas and the transmit antenna and the mutual inductance between the one or more parasitic antennas and a receive antenna of a receiver. The increase in coupling decreases as the one or more parasitic antennas are located further away from the receiver. Therefore, the one or more parasitic antennas may be appropriately sized and spaced to achieve optimum performance across a range of devices.

According to one exemplary embodiment, a wireless power transmitter may be configured to detect a presence of a compatible device (i.e., a wirelessly chargeable device). Furthermore, the wireless power transmitter may be configured to determine a location of a detected compatible device. During one contemplated operation, a wireless power transmitter may periodically perform a system scan by shorting and opening each parasitic antenna at different times to determine if a compatible device is within a respective cell. Additionally, a sudden drop in charging efficiency may trigger a scan as a receiver may have been positioned into a null field zone. Detection of a compatible device may be carried out by methods known in the art, such as monitoring the power transfer efficiency, unloaded receiver voltage, or both during a scan routine. Therefore, the transmitter may be aware of the location of each individual receiver.

Upon detecting one or more compatible device, and determining locations of the detected compatible devices, the wireless power transmitter may short all parasitic coils not having at least one compatible device positioned therein to create a null field zone so that power transfer to a non-compatible device (e.g., an NFC card or rogue receiver) is minimal or possibly eliminated. Accordingly, as will be appreciated by a person having ordinary skill in the art, a field generated by transmitter may be enhanced in areas which do not fall into the null field zone, thus coupling efficiency may be improved.

As previously noted, a wireless power transmitter may include a transmit antenna and one or more parasitic antennas, wherein at least one parasitic antenna has a fixed reactance (i.e., not a dead short). A parasitic antenna including a fixed reactance, such as a capacitive element (i.e., capacitively loaded), may be used to modify a field distribution of a wireless power transmitter (e.g., steering field away from an undesired area or steering field into a desired area). For example, a parasitic antenna may expand a coverage area of a smaller transmit antenna, or concentrate a field of a larger transmit antenna.

FIGS. 10A-10G illustrate various example wireless power transmitter configurations wherein each configuration includes a transmit antenna and at least one parasitic antenna. Specifically, FIG. 10A illustrates a wireless power transmitter 900A including a transmit antenna 901A and concentric parasitic antenna 902A, which is smaller than transmit antenna 901A. FIG. 10B illustrates a wireless power transmitter 900B including a transmit antenna 901B and concentric parasitic antennas 902B1 and 902B2, wherein each of parasitic antennas 902B1 and 902B2 are smaller than transmit antenna 901B. FIG. 10C illustrates a wireless power transmitter 900C including a transmit antenna 901C and a concentric parasitic antenna 902C, wherein parasitic antenna 902C is larger than transmit antenna 901C. FIG. 10D illustrates a wireless power transmitter 900D including a transmit antenna 901D and non-concentric parasitic antenna 902D, wherein parasitic antenna 902D is smaller than transmit antenna 901D. FIG. 10E illustrates a wireless power transmitter 900E including a transmit antenna 901E and non-concentric parasitic antennas 902E1 and 902E2, wherein each of parasitic antennas 902E1 and 902E2 are smaller than transmit antenna 901E. FIG. 10F illustrates a wireless power transmitter 900F including a transmit antenna 901F and concentric parasitic antenna 902F1, which is smaller than transmit antenna 901F. Wireless power transmitter 900F further includes a non-concentric parasitic antenna 902F2, which is smaller than parasitic antennas 902F1. FIG. 10G illustrates a wireless power transmitter 900G including a transmit antenna 901G and concentric parasitic antenna 902G1, which is smaller than transmit antenna 901G. Wireless power transmitter 900F further includes non-concentric parasitic antennas 902G2 and 902G3, each of which is smaller than parasitic antennas 902G1.

FIGS. 11A-11C illustrate cross-sectional views of various example wireless power transmitter configurations wherein each configuration includes a transmit antenna 921 and a parasitic antenna 922. FIG. 11A illustrates a wireless power transmitter 920A including a transmit antenna 921 and parasitic antenna 922, which is positioned below transmit antenna 921. FIG. 11B illustrates a wireless power transmitter 920B including transmit antenna 921 and parasitic antenna 922, which is co-planar with transmit antenna 921. FIG. 11C illustrates a wireless power transmitter 920C including a transmit antenna 921 and parasitic antenna 922, which is positioned above transmit antenna 921.

Figure 12A:
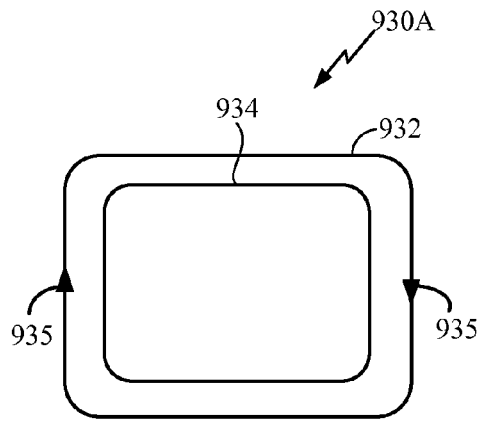
FIGS. 12A-12E illustrate various relationship between a current within a transmit antenna and a current within a parasitic antenna, according to an exemplary embodiment of the present invention.
Figure 12B:
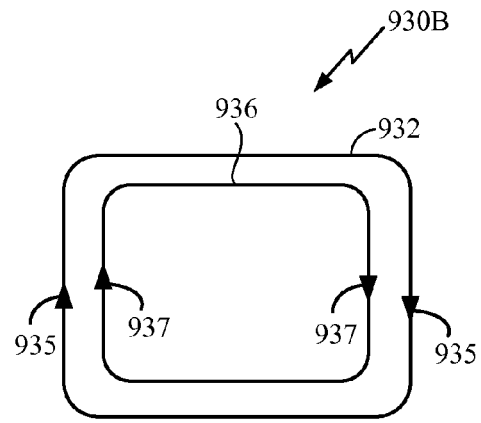
Figure 12C:
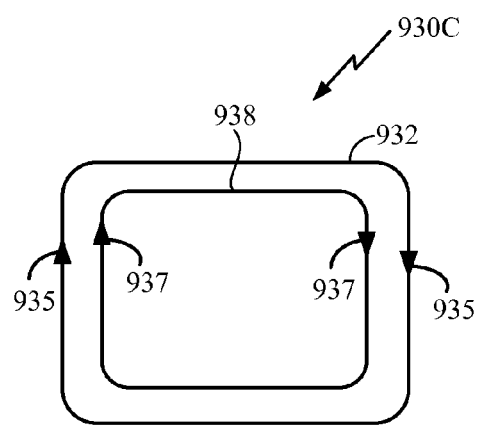
Figure 12D:
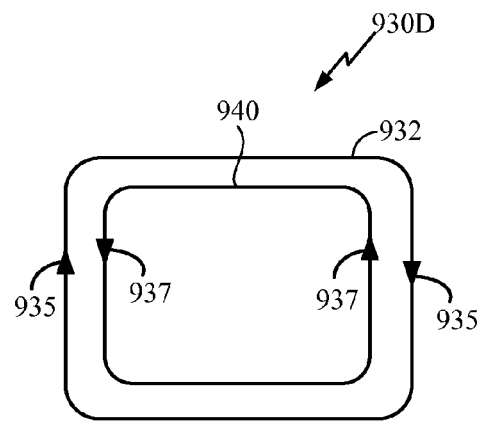
Figure 12E:
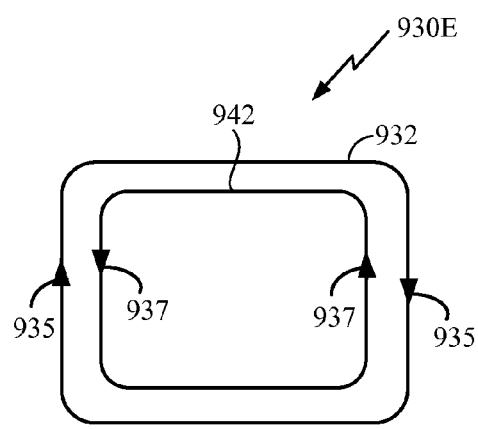

FIGS. 12A-12E illustrate various relationship between a current within a transmit antenna and a current within a parasitic antenna. It is noted that a phase relation between a current within a transmit antenna and the current in a parasitic antenna may determine whether a field (e.g., a magnetic field) within the parasitic coil is decreased or increased. FIG. 12A illustrates a wireless power transmitter 930A including a transmit antenna 932 and a parasitic antenna 934. A current within transmit antenna 932 is in the direction depicted by arrows 935. In this embodiment, parasitic antenna 934 is open-circuited and, therefore, parasitic antenna 934 lacks a current. FIG. 12B illustrates a wireless power transmitter 930B including transmit antenna 932 and a parasitic antenna 936. A current within transmit antenna 932 is in the direction depicted by arrows 935 and current within parasitic antenna 936 is in the direction depicted by arrows 937. In this embodiment, a capacitance of parasitic antenna 934 is less than a capacitance that will cause parasitic antenna 934 to be in resonance at the operating frequency and a current within parasitic antenna 934 is out of phase but in the same direction as a current within transmit antenna 932. FIG. 12C illustrates a wireless power transmitter 930C including transmit antenna 932 and a parasitic antenna 938. A current within transmit antenna 932 is in the direction depicted by arrows 935 and current within parasitic antenna 938 is in the direction depicted by arrows 937. In this embodiment, a capacitance of parasitic antenna 934 is equal to a capacitance that will cause parasitic antenna 934 to be in resonance at the operating frequency and the current within parasitic antenna 934 is in phase and in the same direction as the current within transmit antenna 932. FIG. 12D illustrates a wireless power transmitter 930D including transmit antenna 932 and a parasitic antenna 940. A current within transmit antenna 932 is in the direction depicted by arrows 935 and the current within parasitic antenna 940 is in the direction depicted by arrows 937. In this embodiment, a capacitance of parasitic antenna 934 is greater than a capacitance that will cause parasitic antenna 934 to be in resonance at the operating frequency and the current within parasitic antenna 934 is out of phase and in an opposite direction as the current within transmit antenna 932. FIG. 12E illustrates a wireless power transmitter 930E including transmit antenna 932 and a parasitic antenna 942. A current within transmit antenna 932 is in the direction depicted by arrows 935 and a current within parasitic antenna 942 is in the direction depicted by arrows 937. In this embodiment, a capacitance of parasitic antenna 934 is very high (i.e., a short circuit) and the current within parasitic antenna 934 is 180 degrees out of phase with the current within transmit antenna 932.

It is noted that for enhanced field distribution control, the spacing between each parasitic coil, including overlapping coils, may be adjusted. Further, the size of the parasitic coils and the spacing between parasitic coils may vary depending on, for example, a size of an associated wireless power transmitter. Further, it is noted that various exemplary embodiments of the invention may improve the coupling efficiency and impedance responses by generating a more even magnetic field across the transmit antenna. In addition, by reducing the peak magnetic field within a charging region, potential thermal/fire hazard problems associated with NFC cards may be mitigated. By including active alteration of field distribution, a wireless power system may be able to steer the magnetic field away from a non-compatible device (e.g., an NFC card) and into a compatible receiver. Moreover, an effective charge area may be increased with minimal impact on coupling efficiency.

Figure 13:
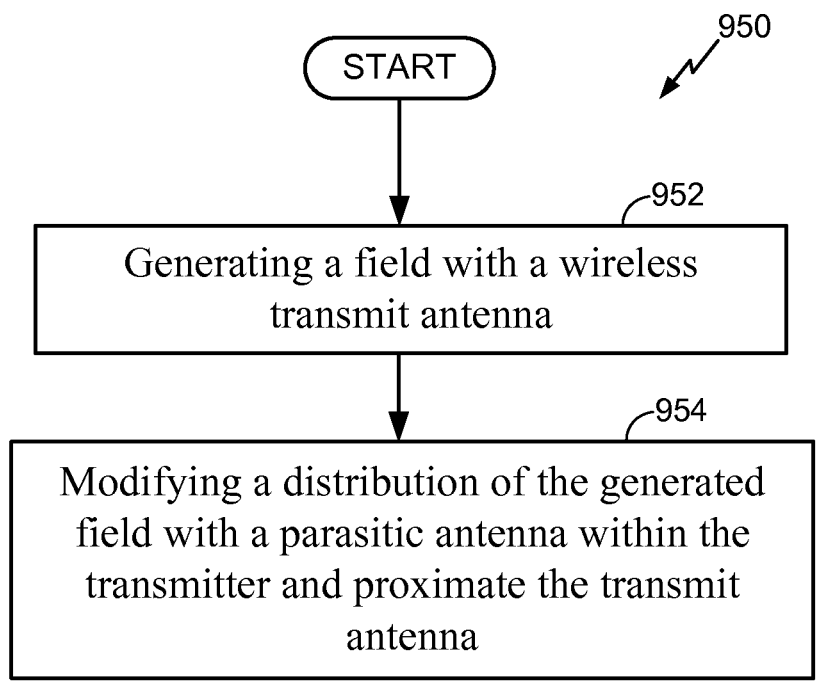
FIG. 13 is a flowchart illustrating a method, in accordance with an exemplary embodiment of the present invention.

FIG. 13 is a flowchart illustrating another method 950, in accordance with one or more exemplary embodiments. Method 950 may include generating a field with a wireless transmit antenna (depicted by numeral 952). Method 950 may further include modifying a distribution of the generated field with a parasitic antenna within the transmitter and proximate the transmit antenna (depicted by numeral 954).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transmitter for wireless power transfer to a receiver, comprising:
  a transmit antenna configured to generate a first field for wirelessly transferring power, the first field at a power level sufficient to charge the receiver; and
  at least one parasitic antenna configured to modify a distribution of the first field, the at least one parasitic antenna comprising a loop configured to be selectively open-circuited when the receiver is positioned substantially within the loop or be selectively closed-circuited when the receiver is positioned substantially outside the loop, the at least one parasitic antenna configured to generate a second field that opposes the first field based on an induced current in the at least one parasitic antenna when the loop of the at least one parasitic antenna is closed-circuited.

2. The transmitter of claim 1, the at least one parasitic antenna comprising at least one parasitic antenna in a first orientation and at least one other parasitic antenna in another orientation substantially perpendicular to the first orientation.

3. The transmitter of claim 1, the at least one parasitic antenna comprising a multi-dimensional array of parasitic antennas.

4. The transmitter of claim 1, the at least one parasitic antenna configured to induce a current to oppose the generated first field.

5. The transmitter of claim 1, the at least one parasitic antenna shorted and detuned to oppose the generated first field.

6. The transmitter of claim 1, the at least one parasitic antenna reactively loaded to modify the distribution of the generated first field.

7. The transmitter of claim 1, the at least one parasitic antenna being positioned above the transmit antenna, being positioned below the transmit antenna, or co-planar with the transmit antenna.

8. The transmitter of claim 1, the at least one parasitic antenna being smaller than the transmit antenna or larger than the transmit antenna.

9. The transmitter of claim 1, the at least one parasitic antenna configured to strengthen a portion of the first field.

10. A method for wireless power transfer to a receiver, comprising:
  generating a first field for wirelessly transferring power with a wireless transmit antenna of a transmitter, the first field at a power level sufficient to charge the receiver;
  open-circuiting a parasitic antenna when the receiver is within an associated loop, where the parasitic antenna is configured to modify a distribution of the first field; and
  short-circuiting the parasitic antenna if the receiver is not within the associated loop, the parasitic antenna configured to generate a second field that opposes the first field based on an induced current in the parasitic antenna when the associated loop is short-circuited.

11. The method of claim 10, comprising:
  wherein the short-circuiting of the parasitic antenna is in response to the receiver not being a compatible device within the associated loop.

12. The method of claim 10, the parasitic antenna comprising an array of parasitic antennas and configured to induce a current in at least one short-circuited, detuned parasitic antenna of the array of parasitic antennas, the at least one short-circuited, detuned parasitic antenna without the receiver within an associated loop.

13. The method of claim 10, further comprising analyzing at least one of a power transfer efficiency and an unloaded receiver voltage to determine a location of the receiver.

14. The method of claim 10, the parasitic antenna configured to create a null field zone in one or more areas within a charging region of the wireless transmit antenna.

15. The method of claim 10, the parasitic antenna with a fixed reactance.

16. The method of claim 10, further comprising:
  selectively short and open circuiting the parasitic antenna to determine a location of receiver.

17. The method of claim 10, the receiver not comprising a near-field communication device.

18. A device for wireless power transfer to a receiver, comprising:
  means for generating a first field for wirelessly transferring power, the first field at a power level sufficient to charge the receiver; and
  means for modifying a distribution of the first field configured to be selectively open-circuited when the receiver is positioned substantially within the means for modifying or be selectively closed-circuited when the receiver is positioned substantially outside the means for modifying, wherein the means for modifying generates a second field that opposes the first field based on an induced current in the means for modifying when the means for modifying is closed-circuited.

19. The device of claim 18, the means for modifying a distribution of the generated field having a fixed reactance.

20. The device of claim 18, the receiver not comprising a near-field communication device.

* * * * *

UNITED STATES PATENT AND TRADEMARK OFFICE
CERTIFICATE OF CORRECTION

| | | |
|---|---|---|
| PATENT NO. | : 8,934,857 B2 | Page 1 of 1 |
| APPLICATION NO. | : 12/951265 | |
| DATED | : January 13, 2015 | |
| INVENTOR(S) | : Zhen Ning Low et al. | |

It is certified that error appears in the above-identified patent and that said Letters Patent is hereby corrected as shown below:

In the Specification

In column 1 at line 52, Below "area." insert --As will be appreciated by a person having ordinary skill in the art, a near field communication (NFC) device may receive excessive power from a wireless power transmitter, which may result in undesirable heating of the NFC device. In addition, a rogue receiver might attempt to pick up power from the wireless power transmitter, thus affecting power delivery to a valid wireless power receiver and system efficiency.-- as a new paragraph.

In column 8 at line 3, Change ""cloaking"" to --"cloaking."--.

In the Claims

In column 18 at line 36, In Claim 16, after "of" insert --the--.

Signed and Sealed this
First Day of December, 2015

Michelle K. Lee
*Director of the United States Patent and Trademark Office*